US006229113B1

(12) United States Patent
Brown

(10) Patent No.: US 6,229,113 B1
(45) Date of Patent: May 8, 2001

(54) METHOD AND APPARATUS FOR PRODUCING A LASER DRILLED HOLE IN A STRUCTURE

(75) Inventor: Robert T. Brown, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/356,528

(22) Filed: Jul. 19, 1999

(51) Int. Cl.$^7$ .................................................. B23K 26/00
(52) U.S. Cl. .................................... 219/121.7; 219/121.76
(58) Field of Search .......................... 219/121.7, 121.71, 219/121.68, 121.69, 121.61, 121.76, 121.6, 121.85, 1

(56) References Cited

U.S. PATENT DOCUMENTS 4,092,515 * 5/1978 Joslin et al. ..................... 219/121.71
4,870,244 * 9/1989 Copley et al. ..................... 219/121.7

FOREIGN PATENT DOCUMENTS

86/02301 * 4/1986 (WO).

OTHER PUBLICATIONS

Yeo et al., "A technical review of the laser drilling of aerospace materials," Journal of Materials Processing Technology, vol. 42 (1994) pp. 15–49.*

Robin et al., "Improved CW laser penetration of solids using a superimposed pulsed laser," Applied Physics Letters, vol. 29, No. 1, Jul. 1976, pp. 3–5.*

Brown, R. T. et al., "High–Brightness Laser Cutting & Drilling of Aerospace Materials", ICALEO 1996–Section C, pp. 78–85.

Chen, X. et al., "Laser drilling of advanced materials: effects of peak power, pulse format, and wavelength", Journal of Laser Applications, 8(5) (1996), pp. 233–239.

Chen, Xiangli et al., "Improved hode drilling using a high peak power Nd:YAG laser at the second harmonic wavelength", Journal of Laser Applications 9(6) (1997), pp. 287–290.

* cited by examiner

Primary Examiner—Samuel M. Heinrich
(74) Attorney, Agent, or Firm—Brian D. Lefort; Ronald G. Cummings

(57) ABSTRACT

The present invention is a method and apparatus for producing a hole in a structure utilizing both an unmodulated beam and a modulated beam. The unmodulated beam first breaks through the structure, thereby forming a guide hole, and the modulated beam then produces a reaming effect by increasing the cross section of the hole to the size of the effective diameter of the modulated beam. The modulated beam increases the cross section of the hole because the modulated beam has a higher beam intensity than the unmodulated beam for a given beam radius.

20 Claims, 4 Drawing Sheets

RADIUS OF BEAM

METHOD AND APPARATUS FOR PRODUCING A LASER DRILLED HOLE IN A STRUCTURE

TECHNICAL FIELD

This invention relates to laser drilling and more particularly to a laser drilling method and apparatus that increases the accuracy and repeatability of a hole produced by such means.

BACKGROUND ART

Drilling a hole in a structure often provides certain benefits and advantages. For example, drilling a hole in a structure, such as an airfoil, provides a means for cooling the airfoil. Specifically, airfoils, such as blades and vanes, within gas turbine engines are exposed to high temperature combustion gases, thereby requiring a method for cooling the airfoil. One such cooling method includes creating holes within the airfoil and passing pressurized air therethrough. As the airfoil rotates through the combustion gases, the pressurized air passes through the interior of the airfoil and exits the cooling holes. Depending upon the configuration of the hole, a portion of the pressurized air may pass over the exterior of the airfoil, thereby creating a film of air between the airfoil and the combustion gases. This method is often referred to as film cooling.

Film cooling efficiency is a function of the relative size of the cooling holes. Specifically, film cooling efficiency increases as the size of the holes more closely resemble each other. The manufacturing process used to drill the cooling holes, therefore, must be capable of producing such holes with sufficient accuracy and repeatability. The two methods currently used to manufacture cooling holes include electro-discharge machining (EDM) and laser drilling. EDM is a process wherein an electrode contacts a structure that is typically immersed in a dielectric fluid, thereby causing a spark and erosion at the point of contact. Although the EDM process produces very accurate holes, this process is typically slow and consumes electrodes, thereby increasing set-up time and material costs. Based upon these two characteristics, EDM is often regarded as an expensive method for producing cooling holes.

Laser drilling is typically a less expensive alternative for producing cooling holes and currently includes the use of either an unmodulated pulsed laser beam or a modulated pulsed laser beam. An unmodulated pulsed laser beam (hereinafter referred to as "unmodulated beam") typically used to laser drill holes has a pulse width of about 0.1 milliseconds (msec) to about 10 msec and a peak intensity on the order of about $1 \times 10^6$ W/cm$^2$ to about $10 \times 10^6$ W/cm$^2$. A modulated pulsed laser beam (hereinafter referred to as "modulated beam") used for the same purpose, typically has a pulse width of about 1 nanosecond (nsec) to about 500 nsec and a peak intensity greater than $1 \times 10^8$ W/cm$^2$. For the purposes of this invention, an unmodulated beam and a modulated beam shall be defined in respect to each other. Specifically, a modulated beam shall be defined as having a shorter pulse width and higher peak intensity in comparison to an unmodulated beam, regardless of the pulse width and peak intensity of the unmodulated beam.

When using a modulated beam, such as a beam having a 100 nsec pulse width and a $1.0 \times 10^9$ W/cm$^2$ intensity, to drill a hole in an airfoil, the modulated beam contacts the airfoil and vaporizes a majority of the material. The modulated beam produces a hole having a typically circular cross section because the material vaporizes rather than boils. Creating the vapor, however, leads to the formation of re-solidified vapor within and/or around the hole. The use of a high intensity beam, such as a modulated beam, also has the potential of creating plasma shielding, which occurs when the intensity of the beam is too high. Upon contacting the surface of the airfoil, the surface ionizes and a plasma layer is created, thereby shielding the internal surface of the hole from additional laser drilling.

When using an unmodulated beam, such as a beam having a 0.5 msec pulse width and a $3.0 \times 10^6$ W/cm$^2$ intensity, to drill a hole in an airfoil, the unmodulated beam contacts the airfoil and melts the material. The molten material escapes the hole primarily in the form of melt droplets but relatively small amounts of material may also exist in the form of vapor. Removing the material in the form of melt droplets, as opposed to vaporizing the material, reduces the amount of re-solidified vapor that forms in the upper portions of the hole and around its entrance. Re-solidified vapor is also referred to as burr. Moreover, when a beam exits a laser, an air stream usually surrounds and/or accompanies the beam so as to prevent any melt or vapor from splashing onto an optical portion of the laser. This air stream, however, often prevents the vapor from escaping the hole, thereby causing re-solidified vapor to form in and around the hole. Hence, utilizing an unmodulated beam minimizes the amount of the material transformed to vapor, thereby preventing re-solidified vapor from forming.

Using an unmodulated beam, however, often creates a boiling reaction between the unmodulated beam and the material. Specifically, the relatively long contact time between the unmodulated beam and the material causes the material to melt and often boil, thereby creating a hole with non-circular cross section. Furthermore, this boiling reaction tends to occur randomly, thereby reducing hole-to-hole uniformity. This melting reaction may also cause the formation of re-cast (i.e., re-melt), which is molten material that re-solidifies and adheres to the internal surface of the hole. Upon adhering to the internal surface, the re-cast behaves mechanically similar to the parent material but has a materially different crystalline structure compared to the parent material. Somewhere during the re-cast formation process, cracks may form, thereby producing undesirable mechanical properties within the airfoil.

What is needed is a method and apparatus that repeatedly produces holes with consistent dimensions in a structure while maintaining its mechanical integrity.

DISCLOSURE OF INVENTION

The method of the present invention uses both an unmodulated and modulated laser beam to create a hole or a cavity, having a circular cross section in a structure, while minimizing the formation of re-solidified vapor in and around the hole or cavity. Minimizing the formation of re-solidified vapor increases the accuracy of the hole or cavity. Therefore, utilizing both an unmodulated and modulated laser beam, in comparison to presently available laser drilling techniques, increases the accuracy of the hole, which in turn increases the hole-to-hole repeatability.

Accordingly, the present invention relates to a method for producing a hole in a structure utilizing an unmodulated beam and a modulated beam. The unmodulated beam first removes a portion of the structural material, thereby forming a guide hole. The modulated beam thereafter enters the guide hole and removes an additional portion of structural material, thereby increasing the cross section of the hole to the size of the effective diameter of the modulated beam.

Utilizing both an unmodulated beam and a modulated beam in this order exploits the advantages of each type of beam. Specifically, forming a guide hole utilizing the unmodulated beam quickly removes a significant portion of the structural material because the unmodulated beam removes the material in the form of droplets. The modulated beam thereafter cleans the hole by removing additional structural material by vaporization. Removing a significant portion of the material with the unmodulated beam, before using the modulated beam, reduces the amount of material removed by the modulated beam, thereby reducing the amount of material that will be removed by vaporization. Decreasing the amount of structural material removed by vaporization minimizes the potential that such vapor could potentially re-solidify within or around the hole, thereby increasing the accuracy of the hole.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
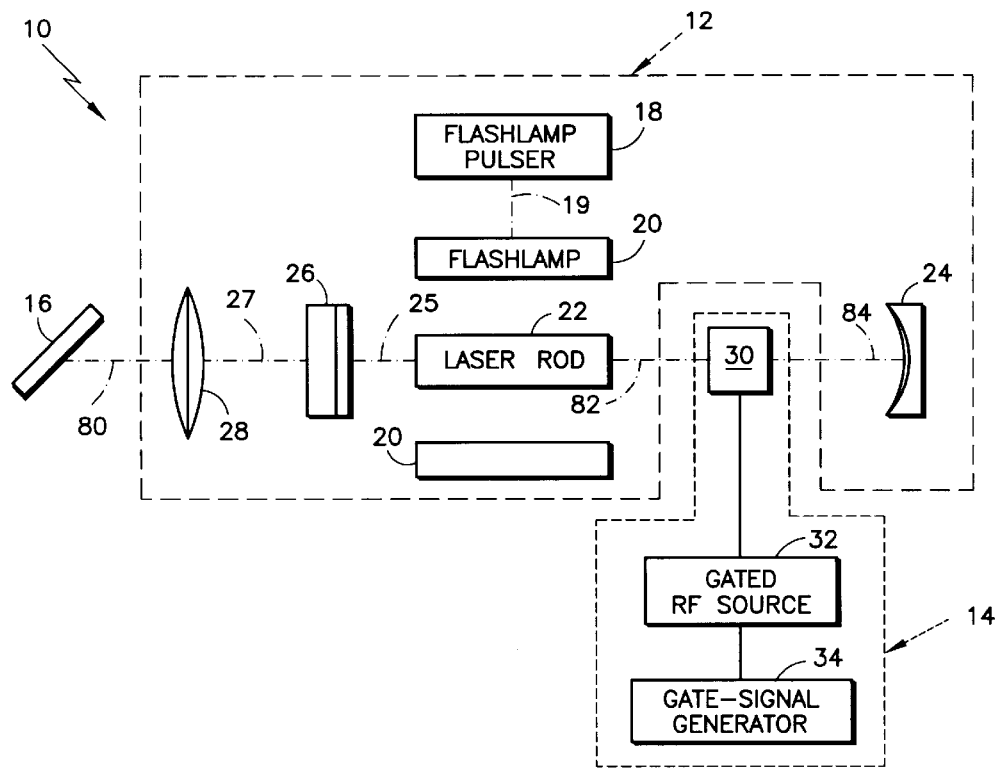
FIG. 1 is a Q-switched laser emitting a focussed beam that contacts a structure.

Referring to FIG. 1, there is shown a Q-switched laser 10 emitting a focussed beam 80 at a structure 16. The Q-switched laser 10 comprises a laser system 12 and a Q-switch 14. Because the type of laser used to produce a hole is often dependent upon the material of the structure, and the material of structure 16 is high nickel alloy, the laser system 12 shown in FIG. 1 is a neodymium yttrium aluminum garnet (Nd:YAG) laser manufactured by Convergent Energy under the tradename Aurora having a Model No. P-50. Such a laser is capable of producing a focussed beam 80 having a wavelength equal to about 1.06 microns, with an unmodulated peak power of about 50 kw and an average power of about 250 W. The preferred operating range of the laser system 12 typically has an unmodulated peak power in the range of about 5 to 20 kW and an average power of about 100 W.

The Nd:YAG laser system 12 comprises a flashlamp pulser 18, a flashlamp 20, a laser rod 22, a mirror 24, an output mirror 26 and a focus lens 28. The flashlamp pulser 18 delivers a signal, in the form of a high current pulse, at a rate of about 10 Hz to 200 Hz along line 19 to the flashlamp 20. The flashlamp 20 receives the high current pulse, which has a pulse width of about 0.1 msec to 10.0 msec, and emits light within the ultraviolet to visible range at the same rate and duration as the high current pulse. The laser rod 22, which is a Nd:YAG crystal, absorbs the light and emits a pulsed beam along line 82. The pulsed beam 82 passes through an acousto-optic modulator 30, discussed hereinafter, along line 84 and contacts the mirror 24. The mirror 24 reflects the pulsed beam along line 84 and again passes through the acousto-optic modulator 30. When the acousto-optic modulator 30 is in the "off" state, the pulsed beam is said to be an unmodulated beam because the pulsed beam retains its original pulse width and intensity as it passes through the acousto-optic modulator 30. Upon exiting the acousto-optic modulator 30, the beam passes through the laser rod 22, thereby amplifying the beam as it exits the laser rod 22 along line 25. A portion of the beam passes through the output mirror 26 along line 27, and the output mirror 26 reflects the remaining portion of the unmodulated beam along line 25 in order to sustain laser oscillation between the output mirror 26 and the mirror 24. The portion of the beam that passes through the output mirror 26 also passes through the focus lens 28, which concentrates and focuses the beam 80 in order to achieve the desired intensity for drilling a hole in the structure 16.

Figure 2:
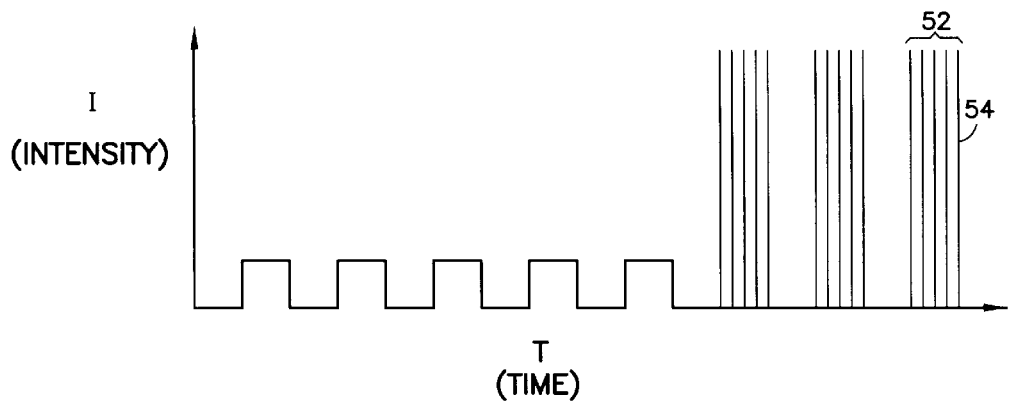
FIG. 2 is the wave form of an unmodulated and modulated pulsed signal emitted by the Q-switched laser illustrated in FIG. 1.

The Q-switch 14 comprises the acousto-optic modulator 30, a gate-signal generator 34 and a gated rf source 32. The Q-switch 14 causes the laser system 12 to emit either an unmodulated beam or a modulated beam. The Q-switch 14 has an "on" state and an "off" state, and when the Q-switch 14 is in the "off" state, the laser system 12 emits an unmodulated beam, and when the Q-switch 14 is in the "on" state, the laser system 12 emits a modulated beam. Regardless of whether the focussed beam 80 is a modulated or unmodulated beam, the focussed beam 80 actually consists of a series of pulses. Referring to FIG. 2, there is shown a chart of intensity versus time, which illustrates a series of unmodulated pulses and a series of modulated pulses emitted by the Q-switched laser 10 illustrated in FIG. 1. The signal represented by numeral 50 is an unmodulated pulse and typically has a pulse width of about 0.2 to 1.0 milliseconds (msec) and an intensity of about $2 \times 10^6$ to $8 \times 10^6$ $W/cm^2$. The pulse represented by numeral 54 is a modulated pulse (i.e., micro pulse) and typically has a pulse width of about 50 to 200 nanoseconds (nsec) and an intensity of about $2 \times 10^8$ to $1 \times 10^9$ $W/cm^2$.

Figure 3:
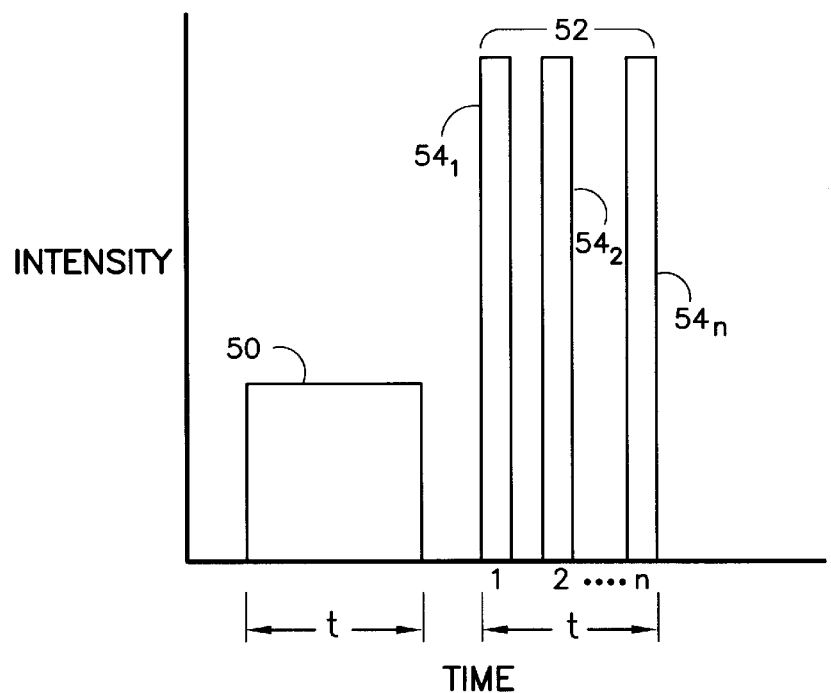
FIG. 3 is an enlarged view of the modulated and unmodulated pulsed signals shown in FIG. 2.

Referring to FIG. 3 there is shown a further explanation of the relationship between an unmodulated pulse 50 and a modulated pulse 54. The unmodulated pulse 50 is a continuous pulse over a time period t, but a modulated pulse is an individual discrete micro pulse within a macro pulse 52. Each micro pulse is represented by numeral 54 with an individual subscript numeral up to the total number (n) of micro pulses (i.e., $54_1$, $54_2$, ... $54_n$). The total number (n) of micro pulses is dependent upon the number of times the acousto-optic modulator 30 alternates between the "off" and "on" states during the time interval t and the duration the acousto-optic modulator 30 remains in each state. Although the intensity of each micro pulse 54 is greater than the individual intensity of the unmodulated pulse 50, the total energy of each macro pulse 52 is equal to the integral of the energy emitted by the aggregate of the micro pulses $54_1$, $54_2$, ... $54_n$. In accordance with the invention, the total energy emitted by the macro pulse 52 is approximately equal to the total energy emitted by an unmodulated pulse 50 over the same time period t.

Referring back to FIG. 1, the Q-switch 14 of the present invention controls the number of times the acousto-optic modulator 30 alternates between the "off" and "on" states during the time interval t and the duration the acousto-optic modulator 30 remains in each state, thereby controlling the intensity of each micro pulse 54. The gate signal generator 34 sends a square pulse signal to the gated radio frequency (rf) source 32 having a preferred gate frequency in the range of about 40 to 300 kHZ and a preferred pulse width of about 23 to 1 microseconds. One example, includes a gate signal generator 34 that has the capability of producing a square pulse signal having a frequency of 300 kHZ and a pulse width of about 1 microsecond. A Hewlett Packard Model No. 8116A is an acceptable gate signal generator. The gated radio frequency (rf) source 32, in turn, sends a radio frequency signal, having a frequency of about 1 to 1000 MHz, to the acousto-optic modulator 30. Examples of a gated radio frequency (rf) source 32 and acousto-optic modulator 30 include those manufactured by Intra Action, with a Model No. GE-27100T and Model No. AQS-275A1A respectively, which allows the gated radio frequency (rf) source 32 to emit a radio frequency signal, having a frequency of about 27.12 MHz, to the acousto-optic modulator 30. The acousto-optic modulator 30 alternates between the "on" and "off" states at a rate equal to the gate-frequency of the radio frequency signal, which is greater than the frequency signal produced by the flashlamp pulser 18, the device that initiates the formation of the modulated pulse. When the Q-switch 14 is in the "on" state, the Q-switch 14 creates modulated pulses $54_1, 54_2, \ldots 54_n$ from an unmodulated pulse 50. In one example, the gate signal generator 34 produced a 300 kHZ signal that the gated radio frequency (rf) source received. The gated radio frequency (rf) source, in turn, produced a gated 27.12 MHz radio frequency signal that created a series of modulated pulses $54_1, 54_2, \ldots 54_n$. Each modulated pulse $54_1, 54_2, \ldots 54_n$ had a pulse width of about 100 nsec and an intensity of about $2\times10^8$ W/cm$^2$. The modulated pulses derived from an unmodulated pulse 50 having a pulse width of about 0.5 msec and an intensity of about $6\times10^6$ W/cm$^2$. Thus, about 150 modulated pulses occurred in the time about one unmodulated pulse occurred.

Figure 4:
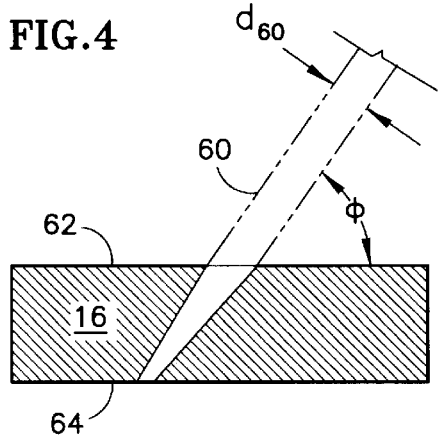
FIG. 4 is a side sectional view of a structure showing an unmodulated beam producing a hole in the structure.

Referring to FIG. 4, there is shown a side view of a structure 16 with an unmodulated beam 60 producing a hole in the structure 16. When the Q-switch 14 is in the "off" state, the laser 12 emits an unmodulated beam 60 with a pulse pattern described in reference to FIG. 2 above. Referring back to FIG. 4, the unmodulated beam 60 has an actual diameter ($d_{60}$) of about 0.038 cm (0.015 in) and an effective diameter ($d_{60'}$) of about 0.033 cm (0.013 inches) and contacts the 5 cm by 7 cm by 0.11 cm structure 16, constructed of a highly concentrated nickel alloy, at an angle ($\phi$) of about 25 degrees. An effective diameter is different than an actual diameter. The beam's actual diameter (i.e., theoretical diameter) is the diameter calculated from standard optical formulas. A common definition of the actual diameter is the diameter of a circular aperture which passes about $(1-e^{-2})\times 100\%$ (i.e., 86.5%) of the total power of the beam. The beam's effective diameter is the diameter of the hole produced by the beam. Therefore, the beam's actual diameter is independent of the beam's absolute power because the beam's actual diameter is a relative measure. The beam's effective diameter, however, is dependent upon the beam's absolute power because the beam will only form a hole representative of that portion of the cross section of the beam that has a power level greater than or equal to a power level that causes the material to melt or vaporize. The unmodulated beam 60 contacts a point on the top surface 62 of the structure 16 and begins to penetrate the structure 16, thereby creating a cavity. Although it is not necessary for the unmodulated beam 60 to pierce through the structure 16, if the unmodulated beam 60 continues to impact the structure 16 for a sufficient time period, then the unmodulated beam 60 penetrates the bottom surface 64 of the structure 16 and creates a hole therein. A cavity shall be defined as a hollow area within a structure that does not pierce through the structure, and a hole shall be defined as a hollow area within a structure that pierces through the structure.

If a hole is created, it is preferable to continue pulsing the unmodulated beam 60 through the structure 16 after the unmodulated beam first penetrates the bottom surface 64 in order to remove any undesired material within the hole. This is especially preferable in removing undesired material at the lower end of the hole. Moreover, continuing to pulse the unmodulated beam 60 produces a cleaner cylindrical hole. Specifically, it is preferable to continue pulsing the unmodulated beam 60 through the structure 16 with additional unmodulated pulses that represent about ten percent (10%) to thirty percent (30%) of the unmodulated pulses required to penetrate through the structure 16. It is especially preferable to use additional unmodulated pulses that represent about twenty percent (20%) of the unmodulated pulses required to penetrate through the structure 16. For example, penetrating the structure 16 from the top surface 62 to the bottom surface 64 with an unmodulated beam 60 having a pulse width of about 0.5 msec and an intensity of about $3\times10^6$ W/cm$^2$ required about ten (10) unmodulated pulses. It was preferable to continue pulsing the unmodulated beam for about one (1) to three (3) additional pulses, and especially preferable to continue pulsing the unmodulated beam for an additional two (2) pulses after the unmodulated beam 60 first penetrated the bottom surface 64.

Figure 5:
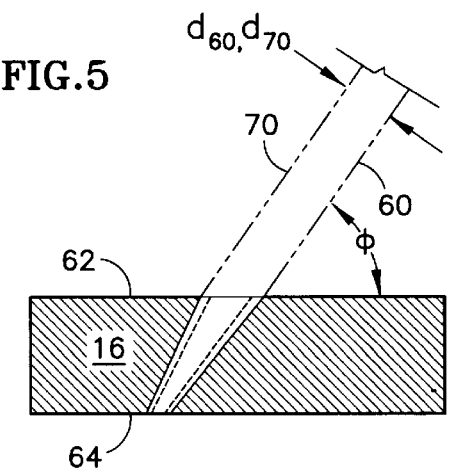
FIG. 5 is a sectional side view of the structure showing a modulated beam reaming the hole created by the unmodulated beam illustrated in FIG. 4.

Referring to FIG. 5, there is shown a side view of a modulated beam 70 reaming the hole created by the unmodulated beam 60. When the Q-switch 14 is in the "on" state, the laser system 12 emits a modulated beam 70, having about the same actual diameter ($d_{70}$) as the unmodulated beam 60, at the same angle ($\phi$) and at the same point on the structure 16 that the unmodulated beam 60 contacted the structure 16. The effective diameter ($d_{70'}$) of the modulated beam 70 is about 0.035 cm (0.014 inches), which is greater than the effective diameter ($d_{60'}$) of the unmodulated beam 60.

Figure 6:
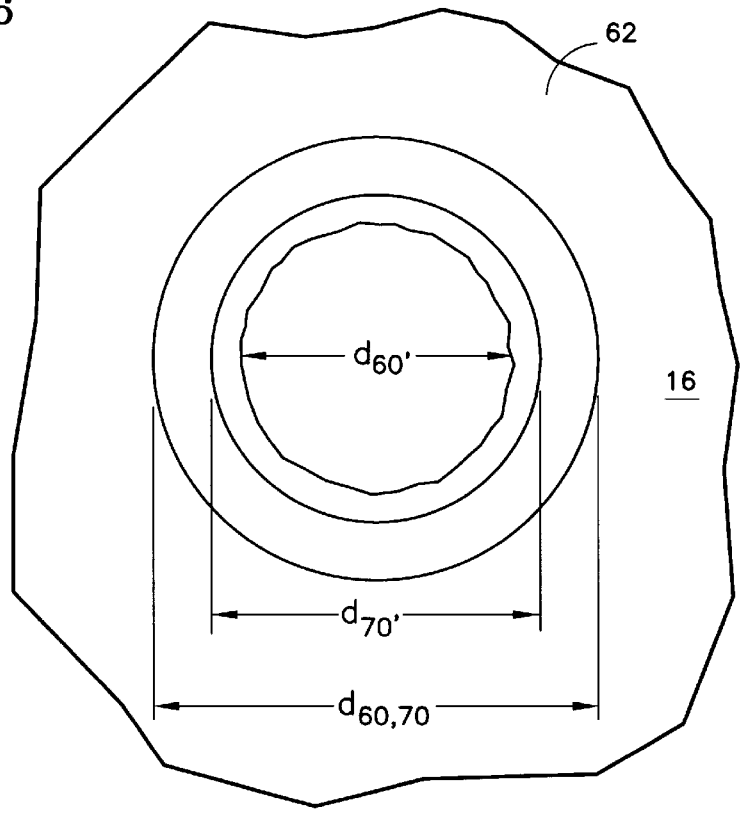
FIG. 6 is a top view of the structure illustrating the size of the actual and effective diameters of the unmodulated and modulated beams.

Referring to FIG. 6 there is shown a top view of the top surface 62 of the structure 16. This figure illustrates the actual diameter ($d_{60,70}$) of the unmodulated and modulated beams 60, 70, the diameter ($d_{60'}$) of the hole drilled by unmodulated beam 60, and the diameter ($d_{70'}$) of the hole drilled by modulated beam 70. This figure illustrates that although the unmodulated and modulated beams 60, 70, have the same actual diameter ($d_{60,70}$), the effective diameter ($d_{70'}$) of the modulated beam 70 is greater than the effective diameter ($d_{60'}$) of the unmodulated beam 60 because the modulated beam 70 drills a larger sized cavity or hole due to the increased power rating of the modulated beam 70 at a given radius.

Figure 7:
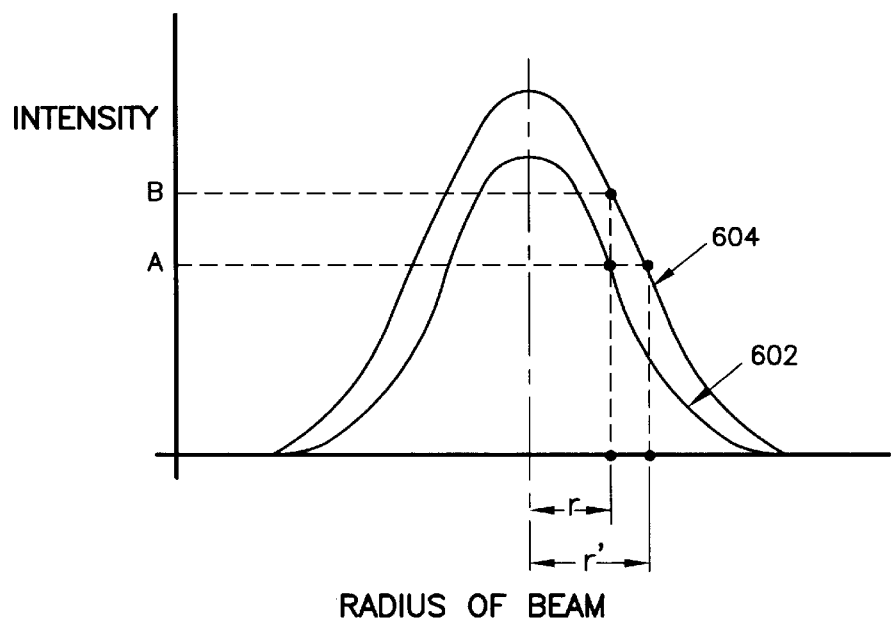
FIG. 7 is a graph of the intensity of the beam as a function of the beam's radius.

Referring to FIG. 7 there is shown a graph of the intensity of the beam versus the radius of the beam. The curve indicated by the numeral 602 represents the profile of the intensity of the unmodulated beam 60 in FIG. 5, and the curve indicated by the numeral 604 represents the profile of the intensity of a modulated beam 70 in FIG. 5. At a radius "r", the intensity level of the unmodulated beam 60 is equal to A, and the intensity level of the modulated beam 70 is equal to B, wherein B is greater than A. Assuming that the unmodulated beam 60 and modulated beam 70 have the same radius (i.e., actual diameter) as shown in FIG. 6, the modulated beam 70 has a higher power level at radius r than the unmodulated beam 60. The inventor of the present invention recognized that as the beam switched from an unmodulated beam 60 to a modulated beam 70, the modulated beam 70 achieved a power level A at a greater radius than the unmodulated beam 60. Specifically, the unmodulated beam 60 achieved a power level of A at radius r, but the modulated beam 70 achieved a power level of A at radius r', which is greater than r. Therefore, although both the unmodulated beam 60 and modulated beam 70 have the same actual diameter, the effective diameter of the modulated beam 70 is greater than the effective diameter of the unmodulated beam 60 because the modulated beam 70 has a higher intensity at a given radius. The present invention exploits this phenomenon of having two beams with the same actual diameter but different effective diameters by using an unmodulated beam 60 to drill the initial cavity or hole and then switches to a modulated beam 70 to increase the diameter of the cavity or hole. The increased intensity of the modulated beam 70 removes the majority of remaining material by vaporization, in comparison to the unmodulated beam 60, which removes a majority of the material by boiling the material, thereby reducing the hole-to-hole variation and producing a hole with a geometry that more closely resembles the circular cross section of the focussed beam 80. The Q-switch 14, therefore, is the means for producing a modulated beam 70 with an effective diameter greater than that of the unmodulated beam 60.

It should also be understood that the configuration of each hole may not be perfectly circular and if this is so, the actual hole diameter is the largest distance across the cross section of the hole. In other words, when the guide hole, drilled by the unmodulated beam, is not perfectly circular, then in order to ream the hole with the modulated beam, the effective diameter of the modulated beam may be greater than or equal to the actual hole diameter. Otherwise, if the hole drilled by the unmodulated beam is perfectly circular, then in order to ream the hole with the modulated beam, the effective diameter of the modulated beam must be greater than or equal to the actual hole diameter.

In order to efficiently produce a clean cylindrical hole, it is also preferable to pulse the modulated beam 70 with a number of macro pulses that represent about forty percent (40%) to eighty percent (80%) of the unmodulated pulses required to penetrate through the structure 16. It is even more preferable that the modulated beam 70 contain a number of macro pules that represent about fifty percent (50%) to seventy percent (70%) of the unmodulated pulses required to penetrate through the structure 16 and especially preferable that the modulated beam 70 contain a number of macro pulses that represent about sixty percent (60%) of the unmodulated pulses required to penetrate through the structure 16. As mentioned above, penetrating the structure 16 from the top surface 62 to the bottom surface 64 with an unmodulated beam 60 having a pulse width of about 0.5 msec and an intensity of about $6 \times 10^6$ W/cm$^2$ required about ten (10) unmodulated pulses. It would, therefore, be preferable to pulse a modulated beam 70 having a pulse width of about 100 nsec and an intensity of about $2.0 \times 10^8$ W/cm$^2$ for about four (4) to eight (8) macro pulses, even more preferable to use five (5) to seven (7) macro pulses and especially preferable to use six (6) macro pulses.

Figure 8:
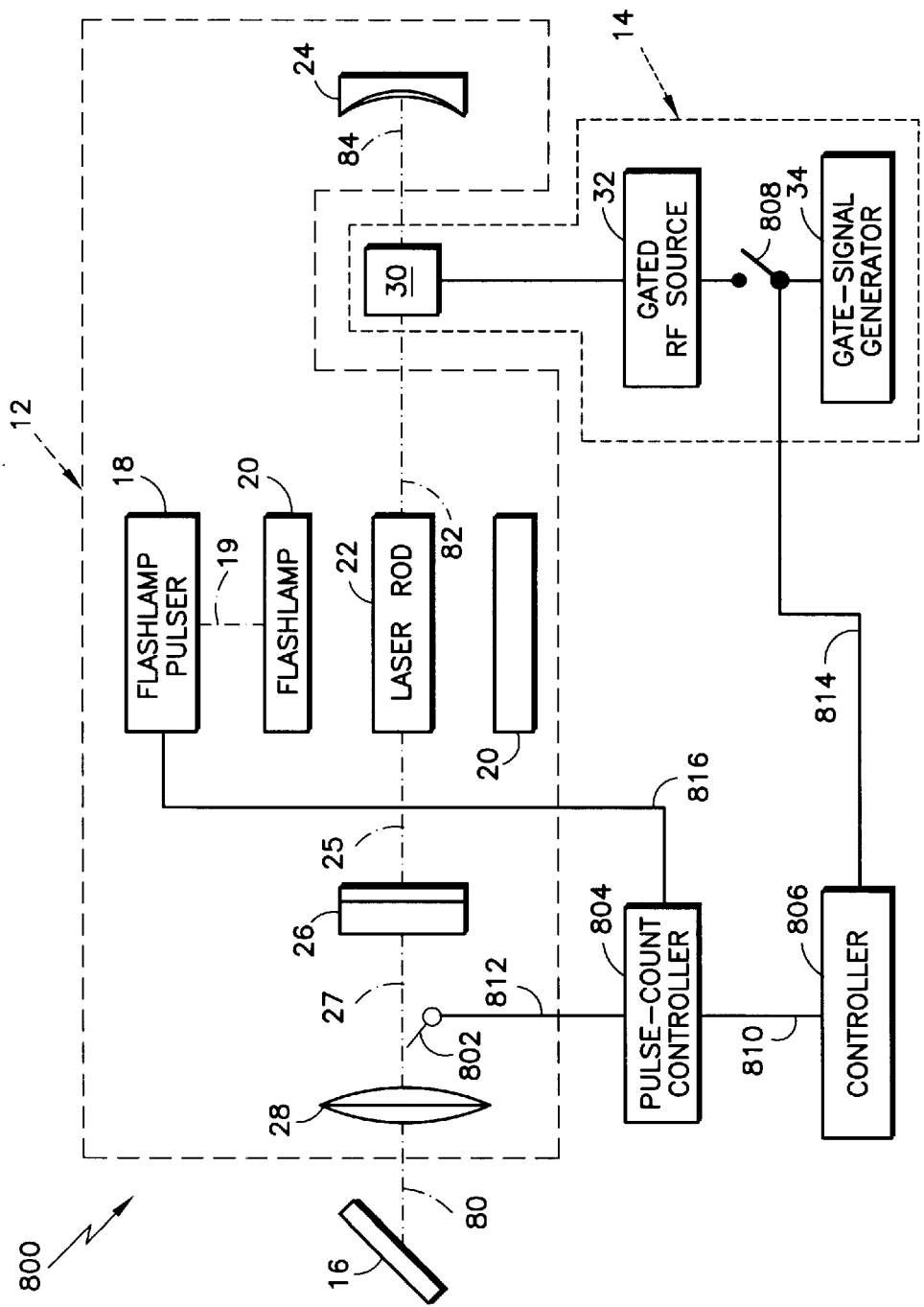
FIG. 8 is a programmable Q-switched laser.

Upon identifying the number of unmodulated and modulated pulses required to drill a hole in a structure, a programmable device can be programmed to control the number and sequence of unmodulated and modulated pulses emitted by the Q-switched laser. Referring to FIG. 8, there is shown a programmable Q-switched laser 800 that comprises a means for controlling the number of unmodulated and modulated pulses. In addition to the laser system 12 and Q-switch 14, which were discussed hereinbefore in reference to FIG. 1, the programmable Q-switched laser 800 also comprises a shutter 802, pulse-count controller 804, controller 806 and a switch 808. The controller 806, such as a computer numerical control (CNC) machine controller, comprises programmable logic, which controls the number and sequence of unmodulated and modulated pulses that the programmable Q-switched laser 800 emits. For example, assuming it is necessary for the programmable Q-switched laser 800 to emit ten (10) unmodulated pulses to penetrate the structure and it is preferred that the programmable Q-switched laser 800 emits two (2) additional unmodulated pulses after penetrating the structure in order to remove any undesired material within the hole and it is preferred that the programmable Q-switched laser 800 emit six (6) macro pulses to ream the hole, the controller 806 is programmed to emit twelve (12) unmodulated pulses and two (2) macro pulses. The controller 806 sends a signal along line 814 to the switch 808, such as an electronic switch, and this signal causes the switch 808 to open the circuit between the gated radio frequency (rf) source 32 and the gate signal generator 34. In response, the laser system 12 produces unmodulated pulses. The controller 806, thereafter, delivers a signal along line 810 to the pulse-count controller, which, in turn, transmits a signal along line 812 to the gate 202, such as a mechanical gate. This signal opens the gate 202 and allows the laser system 12 to emit twelve (12) unmodulated pulses. Because the flashlamp pulser 18 initiates the pulses, the flashlamp pulser 18 emits a signal along line 816 to the pulse-count controller 804, wherein such signal is indicative of the number of pulses that the flashlamp pulser 18 creates. Once the flashlamp pulser 18 creates twelve (12) pulses, the pulse-count controller 804 sends another signal along line 812 to close the gate 802, thereby preventing the laser system 12 from emitting any further unmodulated pulses.

The controller 806, thereafter, sends another signal along line 814 to the switch 808, thereby causing the switch 808 to close, which, in turn, causes the laser system 12 to produce macro pulses. The controller, thereafter delivers another signal along line 810 to the pulse-count controller, which, in turn, sends a signal along line 812 to the gate 202, which opens the gate 202 and allows the laser system 12 to emit six (6) macro pulses. Again, the pulse-counter controller 804 counts the number of macro pulses emitted by the laser system 12, and once it emits six (6) macro pulses, the pulse-count controller 804 sends another signal along line 812 and closes the gate 802, thereby preventing the laser system 12 from emitting any further macro pulses. It should also be noted that the pulse-count controller 804 and the controller 806 could be combined into a single controller, but current machining techniques utilize both devices and the present invention has been described in accordance therewith.

The sequence of steps described above produces a certain sized hole, and the programmable Q-switched laser 800 allows this sequence to be precisely repeated such that additional holes can be produced with accurate repeatability. Increasing the hole-to-hole repeatability within airfoils, thereby minimizes the variation in the amount of the air passing through each hole. Utilizing both an unmodulated beam and modulated beam in sequence allows the unmodulated beam to form a guide hole, which the modulated beam enlarges. The modulated beam creates a reaming effect by removing additional structural material because the modulated beam has a higher intensity and larger effective diameter.

Although the invention has been described and illustrated with respect to the exemplary embodiments thereof, it should be understood by those skilled in the art that the foregoing and various other changes, omissions and additions may be made without departing from the spirit and scope of the invention. Specifically, it should be understood that a variety of lasers having different power ratings and various geometrical shaped structures constructed of different materials and a diverse arrangement of modulated and unmodulated pulses can be used to produce a cavity or a hole.

What is claimed is:

1. A method for producing a cavity in a structure, comprising the steps of:
   (a) directing an unmodulated pulsed laser beam at a point on a structure until a cavity is formed therein, the unmodulated pulsed laser beam having an effective diameter, an intensity and a pulse width; and
   (b) directing a modulated pulsed laser beam at said cavity, thereby increasing the size of the cavity, the modulated pulsed beam having an effective diameter at least as great as the effective diameter of the unmodulated pulsed beam, the modulated pulsed beam having an intensity greater than the intensity of the unmodulated pulsed beam and a pulse width less than the pulse width of the unmodulated beam.

2. A method for producing a hole in a structure, comprising the steps of:
   (a) directing an unmodulated pulsed laser beam at a point on a structure until a cavity is formed therein, the unmodulated pulsed laser beam having an effective diameter, an intensity and a pulse width; and
   (b) directing a modulated pulsed laser beam at said cavity until the modulated pulsed laser beam penetrates through the structure, thereby creating a hole in the structure, the modulated pulsed laser beam having an effective diameter at least as great as the effective diameter of the unmodulated pulsed laser beam, the modulated pulsed laser beam having an intensity greater than the intensity of the unmodulated pulsed laser beam, the modulated pulsed beam having a pulse width less than the pulse width of the unmodulated laser beam.

3. A method for producing a hole in a structure, comprising the steps of:
   (a) directing an unmodulated pulsed laser beam at a point on a structure until the unmodulated pulsed laser beam penetrates through the structure, thereby creating a hole in the structure, the unmodulated pulsed laser beam having an effective diameter, an intensity and a pulse width; and
   (b) directing a modulated pulsed laser beam at said hole, the modulated pulsed laser beam having an effective diameter at least as great as the effective diameter of the unmodulated pulsed laser beam, the modulated pulsed laser beam having an intensity greater than the intensity of the unmodulated pulsed laser beam, the modulated pulsed laser beam having a pulse width less than the pulse width of the unmodulated pulsed laser beam.

4. A method for producing a hole in a structure, comprising the steps of:
   (a) emitting a predetermined number of unmodulated pulses from a laser system to a location on the structure thereby creating a hole through the structure, each of said unmodulated pulses having an effective diameter, an intensity and a pulse width;
   (b) emitting a second predetermined number of unmodulated pulses from the laser system into the hole; and
   (c) emitting at least one macro pulse from the laser system into the hole, said macro pulse comprising a series of modulated pulses, said modulated pulse having an effective diameter at least as great as the effective diameter of said unmodulated pulse, said modulated pulse having an intensity greater than the intensity of said unmodulated pulse, said modulated pulse having a pulse width less than the pulse width of said unmodulated pulse.

5. The method of claim 4 further comprising the step of pulsing a second predetermined number of unmodulated pulses into the hole to clean the hole.

6. The method of claim 5 wherein said second predetermined number is equal to about 10% to 30% of the predetermined number of unmodulated pulses.

7. The method of claim 5 wherein said second predetermined number is equal to about 20% of the predetermined number of unmodulated pulses.

8. The method of claim 4 wherein the number of macro pulses is equal to about 40% to 80% of the predetermined number of unmodulated pulses.

9. The method of claim 4 wherein the number of macro pulses is equal to about 50% to 70% of the predetermined number of unmodulated pulses.

10. The method of claim 4 wherein the number of macro pulses is equal to about 60% of the predetermined number of unmodulated pulses.

11. A laser drilling apparatus, comprising:
    (a) means for directing an unmodulated pulsed laser beam at a point on a structure until a cavity is formed therein, the unmodulated pulsed laser beam having an effective diameter, an intensity and a pulse width;
    (b) means for directing a modulated pulsed laser beam at said cavity, thereby increasing the size of the cavity, the modulated pulsed beam having an effective diameter at least as great as the effective diameter of the unmodulated pulsed beam, the modulated pulsed beam having an intensity greater than the intensity of the unmodulated pulsed beam, and a pulse width less than the pulse width of the unmodulated beam; and
    (c) means for switching from the emission of an unmodulated pulsed beam to the emission of a modulated pulsed beam.

12. A laser drilling apparatus, comprising:
    (a) means for directing an unmodulated pulsed laser beam at a point on a structure until a cavity is formed therein, the unmodulated pulsed laser beam having an effective diameter, an intensity and a pulse width;
    (b) means for directing a modulated pulsed laser beam at said cavity until the modulated pulsed laser beam penetrates through the structure, thereby creating a hole in the structure, the modulated pulsed laser beam having an effective diameter at least as great as the effective diameter of the unmodulated pulsed laser beam, the modulated pulsed laser beam having an intensity greater than the intensity of the unmodulated pulsed laser beam, the modulated pulsed beam having a pulse width less than the pulse width of the unmodulated laser beam; and
    (c) means for switching from the emission of an unmodulated pulsed beam to the emission of a modulated pulsed beam.

13. A laser drilling apparatus, comprising:
    (a) means for directing an unmodulated pulsed laser beam at a point on a structure until the unmodulated pulsed laser beam penetrates through the structure, thereby creating a hole in the structure, the unmodulated pulsed laser beam having an effective diameter, an intensity and a pulse width;

(b) means for directing a modulated pulsed laser beam at said hole, the modulated pulsed laser beam having an effective diameter at least as great as the effective diameter of the unmodulated pulsed laser beam, the modulated pulsed laser beam having an intensity greater than the intensity of the unmodulated pulsed laser beam, the modulated pulsed laser beam having a pulse width less than the pulse width of the unmodulated pulsed laser beam; and (c) means for switching from the emission of an unmodulated pulsed beam to the emission of a modulated pulsed beam.

14. A laser drilling apparatus, comprising:

(a) means for pulsing a predetermined number of unmodulated pulses directed at a location on the structure thereby creating a hole through the structure, each of said unmodulated pulses having an effective diameter, an intensity and a pulse width;

(b) means for pulsing a second predetermined number of unmodulated pulses into the hole;

(b) means for pulsing at least one macro pulse into the hole, said macro pulse comprising a series of modulated pulses, said modulated pulse having an effective diameter at least as great as the effective diameter of said unmodulated pulse, said modulated pulse having an intensity greater than the intensity of said unmodulated pulse, said modulated pulse having a pulse width less than the pulse width of said unmodulated pulse; and (c) means for controlling the sequence of pulsing unmodulated pulses and at least one modulated pulse.

15. The apparatus of claim 14 wherein the means for controlling the sequence of pulsing unmodulated pulses and at least one modulated pulse comprises a program.

16. The apparatus of claim 14 wherein said second predetermined number is equal to about 10% to 30% of the predetermined number of unmodulated pulses.

17. The apparatus of claim 15 wherein said second predetermined number is equal to about 20% of the predetermined number of unmodulated pulses.

18. The apparatus of claim 14 wherein the number of macro pulses is equal to about 40% to 80% of the predetermined number of unmodulated pulses.

19. The method of claim 14 wherein the number of macro pulses is equal to about 50% to 70% of the predetermined number of unmodulated pulses.

20. The method of claim 14 wherein the number of macro pulses is equal to about 60% of the predetermined number of unmodulated pulses.

* * * * *